United States Patent
Kulaga et al.

(10) Patent No.: US 8,856,774 B1
(45) Date of Patent: Oct. 7, 2014

(54) SYSTEM AND METHOD FOR PROCESSING UPDATES TO INSTALLED SOFTWARE ON A COMPUTER SYSTEM

(71) Applicant: Kaspersky Lab, ZAO, Moscow (RU)

(72) Inventors: Andrey A. Kulaga, Moscow (RU); Andrey V. Lashchenkov, Moscow (RU); Andrey V. Kazachkov, Moscow (RU)

(73) Assignee: Kaspersky Lab, ZAO, Moscow (RU)

( * ) Notice: Subject to any disclaimer, the term of this patent is extended or adjusted under 35 U.S.C. 154(b) by 0 days.

(21) Appl. No.: 14/159,004

(22) Filed: Jan. 20, 2014

(30) Foreign Application Priority Data

Oct. 24, 2013 (RU) .................. 2013147289

(51) Int. Cl.
*G06F 9/44* (2006.01)
*G06F 11/36* (2006.01)
*G06F 9/445* (2006.01)

(52) U.S. Cl.
CPC .............. *G06F 8/65* (2013.01); *G06F 11/3672* (2013.01)
USPC ........................................................ 717/168

(58) Field of Classification Search
None
See application file for complete search history.

(56) References Cited

U.S. PATENT DOCUMENTS

| | | | |
|---|---|---|---|
| 6,473,794 B1 | 10/2002 | Guheen et al. | |
| 6,536,037 B1 | 3/2003 | Guheen et al. | |
| 6,898,702 B1* | 5/2005 | Evans | 713/2 |
| 7,500,234 B2* | 3/2009 | Hatasaki | 717/168 |
| 2006/0010448 A1* | 1/2006 | Sathe | 718/102 |
| 2008/0320471 A1* | 12/2008 | Maeda | 717/178 |
| 2009/0077422 A1* | 3/2009 | Khaladkar et al. | 714/33 |
| 2009/0306933 A1 | 12/2009 | Chan et al. | |
| 2011/0288808 A1* | 11/2011 | Fan et al. | 702/118 |
| 2013/0007527 A1 | 1/2013 | Petukhov et al. | |

* cited by examiner

*Primary Examiner* — Philip Wang
(74) *Attorney, Agent, or Firm* — Bardmesser Law Group (57) ABSTRACT

A system and method for testing and optimization of updates. An update is received by a test module, which selects a testing environment and determines a testing period. The test module tests the update in the testing environment and provides the test results to an analyzer module. The analyzer module determines the feasibility of the update installation based on a set of feasibility rules. If the update is deemed feasible, the update is added to the list of the updates for installation and provided to an installation module for installation on computer systems.

18 Claims, 3 Drawing Sheets

SYSTEM AND METHOD FOR PROCESSING UPDATES TO INSTALLED SOFTWARE ON A COMPUTER SYSTEM

BACKGROUND OF THE INVENTION

1. Field of the Invention

The present invention is related to software updates and, in particular, to a method and system for optimization of software updates for elements of a computer system.

2. Description of the Related Art

Development and testing of modern software applications takes a lot of resources.

Modern applications are more complex than in the past, and it is almost impossible to foresee all possible scenarios of application use. Therefore, an application development process always leaves room for errors based on the execution environment and the system configurations. This needs to be taken into account when new software is installed, or when application modules are updated, or when some applications run concurrently.

Typically, an application version is released by a certain date often with an unknown number of bugs and execution errors. Once error reports from users are collected by application developers, they release updates (or patches). However, some users (virus writers or hackers) are engaged in the application errors search. These users find the application errors to take malicious actions and never report the errors they found to the developers to keep them in the dark for as long as possible.

The software vulnerabilities can be exploited in order to affect system integrity, to cause malfunction(s), to access protected computer system resources and gain control over the computer system. The vulnerability can be a result of programming errors or some miscalculations in a design of software.

Most of large software vendors continuously attempt to find and fix vulnerabilities in the applications they released. As a result, in order to eliminate vulnerabilities and correct errors the software updates are produced regularly. Generally there are some difficulties in an update process of computer systems with a large amount of installed software. Frequently, an installation of one application update conflicts with installation of another application update. There are a number of the solutions for optimization of the computer system update process.

U.S. Pat. No. 7,500,234 describes a method for selection of a platform for testing patches. The testing platform is selected based on a computer system configuration and a set of devices employed by the computer system. The proposed method uses selection of pseudo-test platform and simulates an application on this platform. The update is tested in the environment, which basically matches a user computer system. This approach cannot be used for testing updates independent of the user computer configurations.

US Patent Publication No. 20040210653A1 provides an algorithm for analyzing the vulnerabilities of the devices. The analysis determines the necessity of updates based on the detected vulnerabilities and content of the updates. The system does not test the updates and determines the effects of the updates on the functionality of the computer system as whole. However, the described conventional systems are not efficient in case of the computer systems running a large amount of software. Furthermore, the conventional update systems do not estimate a feasibility of the update installation given the information about update vulnerabilities.

Accordingly, a method and system for efficient and effective optimization of computer system update process is desired.

SUMMARY OF THE INVENTION

The present invention is related to software updates on a computer system, and in particular, to a method and system for optimization of software updates on a computer system.

The present invention provides a method, system and computer program product for optimization of software updates on a computer system that substantially obviates one or several of the disadvantages of the related art.

In one aspect of the invention, a system and method for testing and optimization of updates are provided. An update is received by a test module, which selects a test environment and determines a testing period. The test module tests the update in the test environment and provides the test results to an analysis module. The analysis module determines the feasibility of the update installation based on a set of feasibility rules. If the update is deemed feasible, the update is added to the list of the updates for installation and provided to an installation module for installation on computer systems.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

According to the exemplary embodiment, a method, system and computer program product for processing updates prior to the installation is provided. According to an exemplary embodiment, an update is a separately released part of software for correcting software errors, for changing software functionality, for modification of software Graphical User Interface (GUI), etc. Examples of the updates are a program patch, a set of updates—a service pack, and other types of the software updates. The updates can be applied to the most elements of a computer system. Thus, hardware updates, application updates and OS updates can be tested and installed on the computer system.

It is impossible for one vendor during update development to test compatibility with other vendor updates by reason of time constraints and the large amount of software. As a result, some of the application or the driver updates can conflict with other applications and drivers installed on the same computer system. This can impact the functionality and performance of the computer system resulting in a system failure. According to the exemplary embodiment, an update is tested in a test environment in order to determine if it can be seamlessly installed on the computer system.

Figure 1:
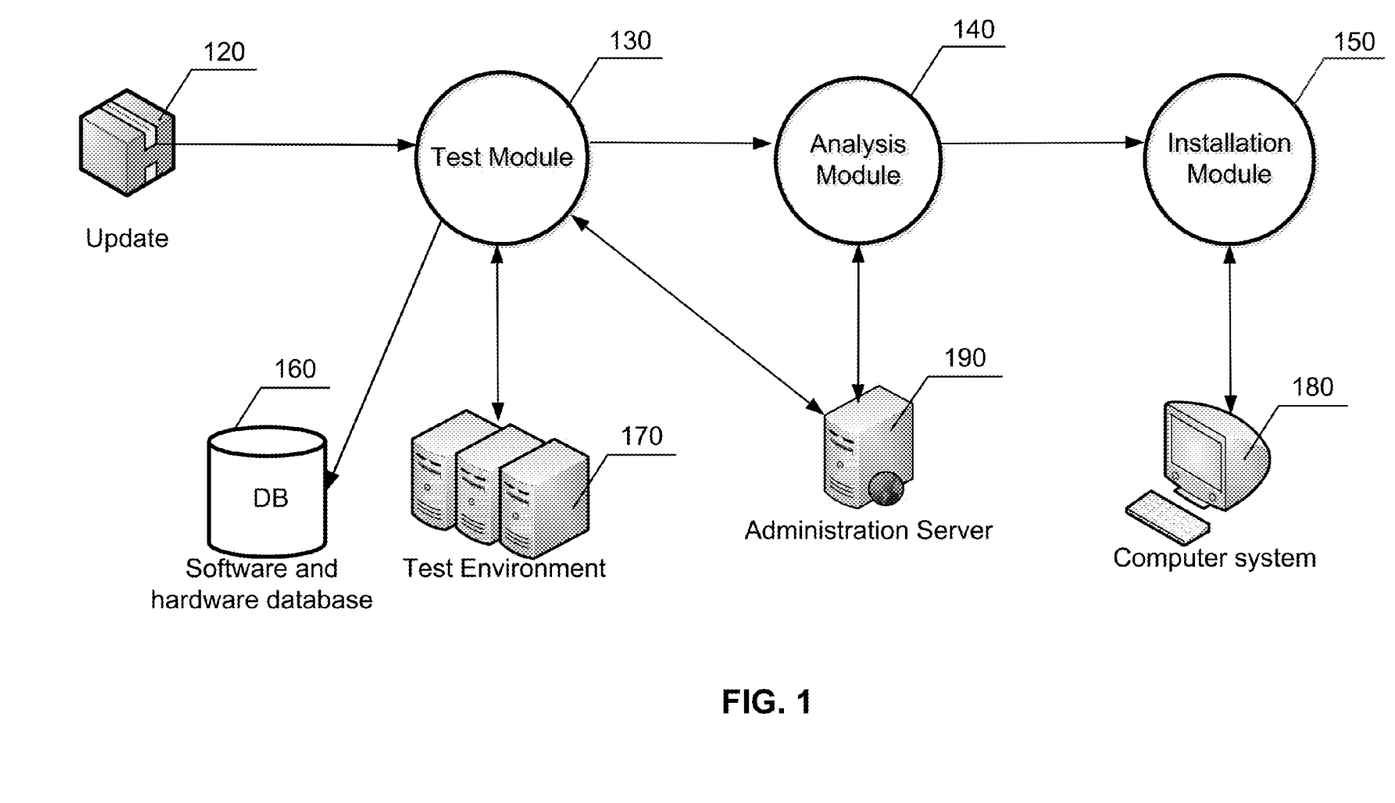
FIG. 1 illustrates an architecture of a system for processing updates in the test environment, in accordance with the exemplary embodiment.

FIG. 1 illustrates an architecture of a system for processing/checking the updates in the test environment, in accordance with the exemplary embodiment. The system for processing and checking the updates includes a test module 130, an analysis module 140, an installation module 150, a software and hardware database 160, a test environment 170, at least one computer system 180 with at least one update provided and an administration server 190. The test module 130 is configured to receive at least one update 120 and the update-related information, to select an optimal test environment 170 and a time period for testing the update 120 in the selected test environment 170.

Moreover, the test module 130 is configured to perform testing and to generate test results of at least one update 120, to provide the test results and the update-related information to the analysis module 140. According to the exemplary embodiment, receiving of the update 120 can be initiated by applications. For example, an application can periodically survey a vendor server for update (e.g., this is implemented by Adobe™) Alternatively, the updates can be initiated by an update server. In some cases, the vendors use their own update server, such as MS Windows Server Update Services (WSUS), which is synchronized with global update servers and downloads the updates required to be installed in a local network. The administration server 190 can play a role of the update server.

The update-related data includes a vulnerability severity and a frequency of exploitation of the vulnerabilities. The vulnerability severity is determined based on a type and a structure of a given vulnerability (e.g., http:**www.microsoft.com/security/sir/story/default.aspx#!10 year_vulnerabies).

Vulnerabilities with high severity are most dangerous, because they are easily exploited and they can result in data losses. The frequency of exploitation of the vulnerabilities is constantly updated upon detection of exploits. The update-related data can be stored in a vulnerability database.

According to the exemplary embodiment, the test module 130 selects an optimal test environment 170 and a period of testing using a selection algorithm. The test environment 170 is a cluster of the computer systems (with elements) that can be used for testing of at least one update. The update testing includes installation of the update in the test environment 170 and subsequent recording of the errors caused by the update considering functional parameters of the computer systems. The test environment 170 can be implemented on a cloud and/or in a virtual machine.

According to the exemplary embodiment, the selection algorithm consists of two stages. In the first stage, an optimal test environment 170 is selected. In the second stage, an optimal testing time period is determined. The selection of the optimal test environment 170 and the testing period are made based on a size and configuration of an enterprise infrastructure. The infrastructure includes all computer systems employed by the enterprise. The computer system-related data is stored in the software and hardware database 160. The software and hardware database 160 also includes data reflecting the infrastructure, a configurations of the computer systems, a computer systems usage frequency, software and hardware usage frequency.

According to one exemplary embodiment, the computer systems of the enterprise infrastructure can have an administration agent installed. The administration agent finds the information on installed applications, devices, configurations of the computer systems, usage frequency of the computer systems, usage frequency of the applications and devices. The administration agent keeps a log of user actions, computer system element loads, interrupts, errors. The administration agent can store data into the software and hardware database 160. Additionally, the administration agent can limit the activity of the applications based on the vulnerabilities and the actual activities of the applications.

According to one exemplary embodiment, the software and hardware database 160 is filled by a Network Access Control system, which works together with a Hardware/Software Inventory system. Once the computer system is registered in the network, the Hardware/Software Inventory (H/SI) system analyses the registered computer system and stores the system configuration data and the usage frequency of software and hardware installed on the computer system. The H/SI system analyses all registered computer systems regularly.

According to the exemplary embodiment, the access to the network resources can be completely blocked based on the host configuration. Additionally, the software and hardware database 160 also can include the computer system activity-related information either on the online or on the offline computer systems used previously.

The test module 130 requests, from the software and hardware database 160, the data reflecting the most suitable computer systems for testing the update 110. The selection of the optimal test environment 170 and the time period for testing the update 120 is mainly based on the enterprise infrastructure size, the configurations of the computer systems, the computer systems usage frequency, the software and hardware usage frequency as shown in the table:

| Infrastructure size | Configuration of computer systems | Computer system usage | Software and hardware usage |
| --- | --- | --- | --- |
| Huge (f.e. office of corporation >= 200 computer systems) | All 4 types of computer systems: | | |

-continued

| Infrastructure size | Configuration of computer systems | Computer system usage | Software and hardware usage |
|---|---|---|---|
| | server-based - 30; | 10 - 24/8; 7/5 (24 hours (eight-our day), 7 days (5 day working week)); | server-based OS module 1 - 20/24 (20 hours of 24 hours of computer system usage); server-based OS module 2 - 16/24; server-based application 1 - 24/24 ; server-based application 2 - 4/24; server-based device 1 - 22/24; |
| | | 10 - 8/8, 5/5. | server-based OS module 1 - 8/8; server-based OS module 2 - 3/8; server-based application 1 - 5/8 ; server-based application 2 - 3/8; server-based device 1 - 7/8; |
| | | 10 - 3/8, 2/5. | server-based OS module 1 - 1/3; server-based OS module 3 - 3/3; server-based application 1 - 1/3; server-based application 2 - 3/3; server-based device 3 - 3/3; |
| | stationary - 100; | 60 - 8/8;5/5 | standard OS (Windows 7) module 1 (network connections) - 6/8; standard OS (Windows 7) application 1 (Microsoft IE 10) - 5/8; standard device 1 (motherboard socket 1366) - 8/8; |
| | | 20 - 5/8;4/5 | standard OS (Windows 7) module 2 (RAM I/O) - 5/5; standard OS (Windows 7) application 2 (Microsoft Office 2010) - 4/5; standard device 2 (processor Intel x86) - 5/5; |
| | | 20 - 2/8;2/5 | standard OS (Windows 7) module 1 (network connections) - 2/2; standard OS (Windows 7) module 2 (RAM I/O) - 2/2; standard OS (Windows 7) application 2 (Microsoft IE 10) - 2/2; |
| | mobile - 40; | . . . | |
| | virtual -30. | . . . | |

There are four types of computer system configurations: server-based, a stationary configuration, a mobile and a virtual configuration. The server-based system uses server-based hardware: server processor (e.g., Intel Xeon), multi-port server network cards; software for servers; server OS (e.g., Microsoft™ Server), server applications (e.g., web services, mail services, etc.).

A stationary computers system, such as a PC, has a standard hardware: processor (e.g., Intel x86), a motherboard (socket 1366); standard software: (standard OS e.g., Microsoft™ Windows), applications for standard OS (e.g., Microsoft™ Word, Adobe™ Photoshop). A mobile computer system, such as a Smart Phone, uses a mobile hardware: mobile processor (MTK), a mobile graphic processor (NVidia Tegra, Qualcomm Adreno); mobile software: mobile OS (e.g., Android™, iOS™) and mobile applications (GO Weather, Play Market). A virtual computer system (e.g., VMware™ Workstation) has a virtual hardware: (VMware™ virtual ethernet adapter; software that can be installed on virtual computer system: a Guest OS (e.g., server OS, standard OS, mobile OS, etc.), the applications executed on the Guest OS (according to the installed OS). The more computers with similar configurations are used in the enterprise infrastructure, the easier it is to select the optimal test environment 170 and the testing period for the updates.

The more diverse is the infrastructure of the enterprise, the more difficult it is to select the optimal test environment 170. The diversity of hardware, such as motherboards, processors, memory, etc. produced by different vendors is an additional problem. A simple infrastructure includes a large number of the stationary computer systems and a small number of the systems with other configuration. A complex infrastructure includes a plurality of the computer systems of different types of configuration.

According to the exemplary embodiment, an update testing complexity rating is used for selection of the test environment 170.

| Update | Update complexity rating | Test environment | Time period |
|---|---|---|---|
| Bug fix (function 1) for server-based OS module 2 | high | 1 server including server-based device 1 of regular usage (or higher if possible) with server OS module 2 (required) and any applications (optional); 1 server including server-based device 2 of regular usage (or higher if possible) with server OS module 2 (required) and any applications (optional); | 2 weeks |

-continued

| Update | Update complexity rating | Test environment | Time period |
|---|---|---|---|
| Update for server-based device 3 driver | high | 1 server including server-based device 3 of regular usage (or higher if possible) with server OS module 2 (required) and any applications (optional); 1 server including server-based device 3 or regular usage (or higher if possible) with any OS that uses device 3 (required) 1 server including server-based device 3 or regular usage (or higher if possible) with any application that uses device 3 (required) | 1 week |
| Update for server-based application 2 | low | 1 server including server-based OS with installed server-based application 2 (required) of regular usage (if possible but not required) with any devices (optional) | 2 days |

The highest rating is given to the OS updates and the updates of the elements of the OS as illustrated by the above table. The complexity of the highest rating update testing results from necessity of the test environment 170 that includes a maximum number of different devices (of one type of configuration) and installed applications. Moreover, the highest rating is given to the updates of the drivers and the hardware-related applications. These updates are also released rather frequently and the errors caused by these updates can be crucial for a computer system.

The test environment 170 can include a computer system with the installed OS and a certain device for which the driver update is provided. A medium rating is given to the updates of the popular applications, such as office applications, browsers, graphic editors, etc. The testing environment has to include a maximum number of different devices (of one type of configuration) and applications. Moreover, the popular application for which the update is provided has to be installed with the other applications. These updates are also released rather frequently. Note that for the medium rating the diversity of the devices in the test environment 170 is generally less relevant.

A low rating is assigned to updates of infrequently used specialized applications. These types of updates are released rarely. The optimal testing environment for the updates of low rating test complexity is a particular computer system or a VM running the application, for which the update is provided. In some cases, the updates of all test complexity ratings can be reassessed and reassigned. Another important parameter used for test environment 170 selection is a computer system usage frequency. It is recommended to include computer systems into the test environment 170 with the most frequent usage for achieving better test effectiveness. The most frequently used computer systems should be firstly selected based on configurations and the rating of the update testing.

However, in some cases, when critical errors are possible, the testing on the most frequently used computer systems can be unsafe, because the errors can cause a crash of an important node of the infrastructure. The computer systems with the regular usage frequency are recommended but less effective in terms of the testing. Note that the lack of effectiveness can be increased by using a larger number of the computer systems in the test environment 170. A regular usage frequency for the stationary computer systems is 4 hours (eight-hour day, five days a week). However, the system administrator can set a regular usage frequency at, for example, 6 hours per day (eight-hour day, 5 days a week). Accordingly, the computer systems with the frequency usage more than 6 hours per day (eight-hour day, 5 days a week) are the most frequently used. Note that usage frequency and rating of the update are two separate criteria used for selecting the test environment.

The less frequently used computer systems can be used as the test 170 environment for the low rating updates. If these computer systems do not have some devices or applications for which the low rating update is provided, the devices can be connected and the applications can be installed temporarily by the administrator. Also the users are invited to perform actions for testing installed applications/devices with updates. Subsequently, the applications and devices can be removed. The less frequently used computer systems can be also added to the test environment 170 as an addition to the other computer systems with the other frequency usage.

Another parameter for selection of the test environment 170 is a hardware and software usage frequency on the computer system. Information, such as an up-time usage, a processor time usage, a boot and service operation number and etc., is used for estimation of the software and hardware usage frequency. According to the exemplary embodiment, the administration agent can be used for determination of the software and hardware usage frequency (the information used for estimation of the software and hardware usage frequency). The usage of stationary or mobile computer systems requires actions performed by the users.

The software and hardware usage frequency determination can be based on tracking the types of a user session starts and closes, an activity estimation of installed input devices (touch screen, keyboard, mouse, etc.). Additionally, the determination can be based on types of the device plugging (flash memory cards, etc.). If the time period between the events of the system usage (i.e., mouse movement, query processing, etc.) does not exceed a threshold, this entire time period is considered to be a period of the computer system usage.

The most frequently used computer systems with the frequently used devices and applications that should be updated are the most optimal test environment 170. However, the use of the most optimal test environment 170 can result in crashing of an important node of the network. Thus, the recommended test environment 170 is a regular usage frequency computer system with the software and hardware with the regular usage frequency as well. It is preferable to avoid situations when a most frequently used computer system is used for testing of the update of a rarely used device or the application. This is regulated by the test module 130 when selecting the optimal test environment 170.

According to the exemplary embodiment, the algorithm for selection of the optimal test environment 170 is implemented as follows. First, the update difficulty rating is determined. Then, the optimal computer systems are selected from the infrastructure based on the usage frequency. Subsequently, the computer systems with the optimal software and hardware usage frequency are selected from the previously selected computer systems.

Two entities emerge to influence the selection of optimal testing time period. On one hand, the shorter is the time period, the less accurate are the testing results. Additionally, the probability of errors and failures increases. On the other hand, the longer the time period is, the longer the computer systems outside of the test environment 170 work without some updates that can include the bugs and vulnerability fixes. In this case the probability of the errors and failures also increases because of the malicious code using the bugs or vulnerabilities can be executed.

Additionally, there is a probability of a secret information loss, a leak of valuable data, and a system halt or crash. Some typical errors encountered by the applications or devices have a predictable negative impact on the business processes (except for the errors that have an accumulative effect increased with the usage of the application). However, the risk of using an application with vulnerabilities increases sharply when an application that uses the vulnerability (an exploit) is introduced to the computer system. Thus, selection of the test period has to do with selection of optimal ratio of possible risks. The current vulnerability severity defined by experts is used as main criteria for determining the test period.

The higher is the vulnerability level, the shorter is a test period of the updates that cover the given vulnerabilities. The selection of the testing time period is implemented based on the update rating. The updates with the high rating require a longer testing period. For example, the OS updates need to be tested for two weeks (give or take a day or two). All possible combinations of the devices, computer systems and the installed applications can be tested. The updates with a medium rating can be tested over a week (give or take a day) and the low rating updates are tested over a 2-3 days period. Since these updates are produce infrequently, they generate errors very rarely.

The role of the computer system on which the update needs to be installed is taken into consideration. For example, an update of the server OS intended for optimization of the network data exchanges requires the testing period of several months. Such a long testing period allows for compensation of minority of servers and for concentrating on the update log check. However, if an update does not carry any critical changes (according to the description provided by update developers), the update can be installed without testing regardless of its rating.

Thus, if there is a start value of the update testing time period based on the size and the configuration of a given enterprise infrastructure, this value can be updated and the testing time period of updates of all test complexity ratings with regard to the severity of vulnerability can be estimated. If selection of the test environment 170 is not possible, the testing of the updates for the applications and the OSs can be implemented on the administration server 190, which has a configurable test environment 170. Additionally, the administration server 190 can provide the configurable test environment 170 in a form of a virtual computer system (i.e., a VM)

According to the exemplary embodiment, a computer system which meets the criteria for the test environment 170 can have an application for recording standard user actions performed with a given application or with the OS for which the update is provided. Recording can be implemented in different ways, for example by generating scripts of some user actions or by forming a system action log by driver interception. Then, the administration server 190 creates a virtual computer system (e.g., a VM, a sandbox, an emulation environment, etc.) and installs the required OS and the applications on the VM. Subsequently, a sequence of the standard user actions received from the recording application is emulated. Upon completion of testing, the administration server 190 generates the test results and provides them to the analysis module 140.

The recorded user actions can also be used on the computer systems that have not been selected for the test environment 170 due to a low usage frequency of the systems or of the applications installed on these systems. Thus, automated execution of user actions can eliminate a need for the actual user performing the testing. The user actions and subsequent application behavior are recorded.

The test module 130 installs the updates into the test environment 170 and tests the updates over a pre-determined testing period. The test module 130 generates the test results. Then, the test module 130 provides test results and the update-related information to the analysis module 140. The test results contain data reflecting errors and malfunctions that have occurred on the computer system after installation of the update and during the testing. The test results also include periodic measures of resource usage (i.e., CPU loads, memory usage, network activity, etc.) by the computer system.

Different kinds of errors and bugs can appear after update installation. For example, a complete failure of the OS, a failure of an application or a device, a partial limitation of the functionality of the OS, of an application or a device. A malfunction can be, for example, exceeding a load threshold on the computer system, a decrease in operation speed, etc. The tested computer system behavior is logged for further analysis.

According to the exemplary embodiment, the administration server 190 is used for storing a vulnerability database that includes data reflecting the usage statistic, severity of the vulnerability and the update-related information. The vulnerability exploitation statistics continuously change. The administration server 190 periodically updates the vulnerability database to keep the information current. If during the update testing the vulnerability level increases (for example, when the information in the vulnerability database is refreshed) and the update includes this vulnerability, the time period of initiated update testing can be shortened.

It is not possible to test the individual updates separately on a complex computer system. Thus, the updates are aggregated into groups according to a certain criteria. The criteria can be a release date, a rating, a role of the computer system, etc. Note that the test 170 environment and the testing period can be modified based on the criteria for updates aggregation. If two updates are tested the longer test period will be selected. When the updates are aggregated into a group, it has to be considered that some new updates can be released during the testing of the group. The updates have to be integrated into the group.

For example, the OS update can be released right after the update of a frequently used application. The new update for the OS can be released prior to completion of the testing of the pervious OS update. Thus, the test 170 environment and the testing period need to be modified. For example, the testing period can be reduced and the testing environment can be extended.

The test module 130 provides the test results and the update-related information to the analysis module 140. The analysis module 140 is configured to determine the feasibility of at least one update installation based on a set of feasibility rules. If the update is deemed feasible, the update is added to the list of the updates for installation. The list of the updates is provided to the installation module 150. The analysis module 140 determines the feasibility of the update installation based on the test results and the update-related data.

The feasibility rules contain the conditions used for selecting the tested updates for installation or for discarding the updates. The main feasibility rule, which disallows the installation of the update, is as follows. The update that raises critical OS errors or causes a critical degradation of the system efficiency cannot be installed even if it is the update of vulnerability severity 5. An example of a feasibility rule for installation of the update is: if an update fixes system vulnerability and the update test results do not reveal any negative effects with respect to the system efficiency, the update is always installed. This rule is also applied if the update reveals a vulnerability of the lower level. The feasibility of the update can be denied based on a frequency of exploitation of the particular vulnerability by a malware. The rules can be a part of the analysis module 140, or can be stored in a database or on the administration server 190. The rules can be added, updated or deleted.

If a frequency of the exploitation of the vulnerability by the malware determined after the update is higher than the one prior to the update, the update is not installed. The vulnerability exploitation data constantly changes. The installation module 150 is configured to install at least one update from the feasible update list to a computer system 180. The computer system 180 (at least one update provided for the computer system 180) is a computer system of unspecified configuration with elements for which the update is provided. In this example, the test environment 170 can contain only one computer system with the same configuration as the computer system 180. However, in case of the group updates, a large number of the computer systems are used in the test environment 170.

In case of a one testing computer system, the testing can use the control points method. This is implemented by storing the OS snapshots and recovering (or rolling back) the computer system to a particular state, if the update causes a crash. In MICROSOFT WINDOWS this method is implemented as a System Recovery service. If the update is issued for the server OS and the infrastructure has only one mail server, the server computer system with the server OS and the mail application is used for testing the update. So test environment 170 will be the same as computer system 180 (at least one update provided for the computer system 180).

Note that the computer system for which the update is intended may be excluded from the testing environment and the update is installed on this computer system after it has been tested and the feasibility analysis has been performed. Note that a testing period of an update that is already being tested can be reduced, if the testing of vulnerabilities covered by the update reduces the safety level because of updated data.

Figure 2:
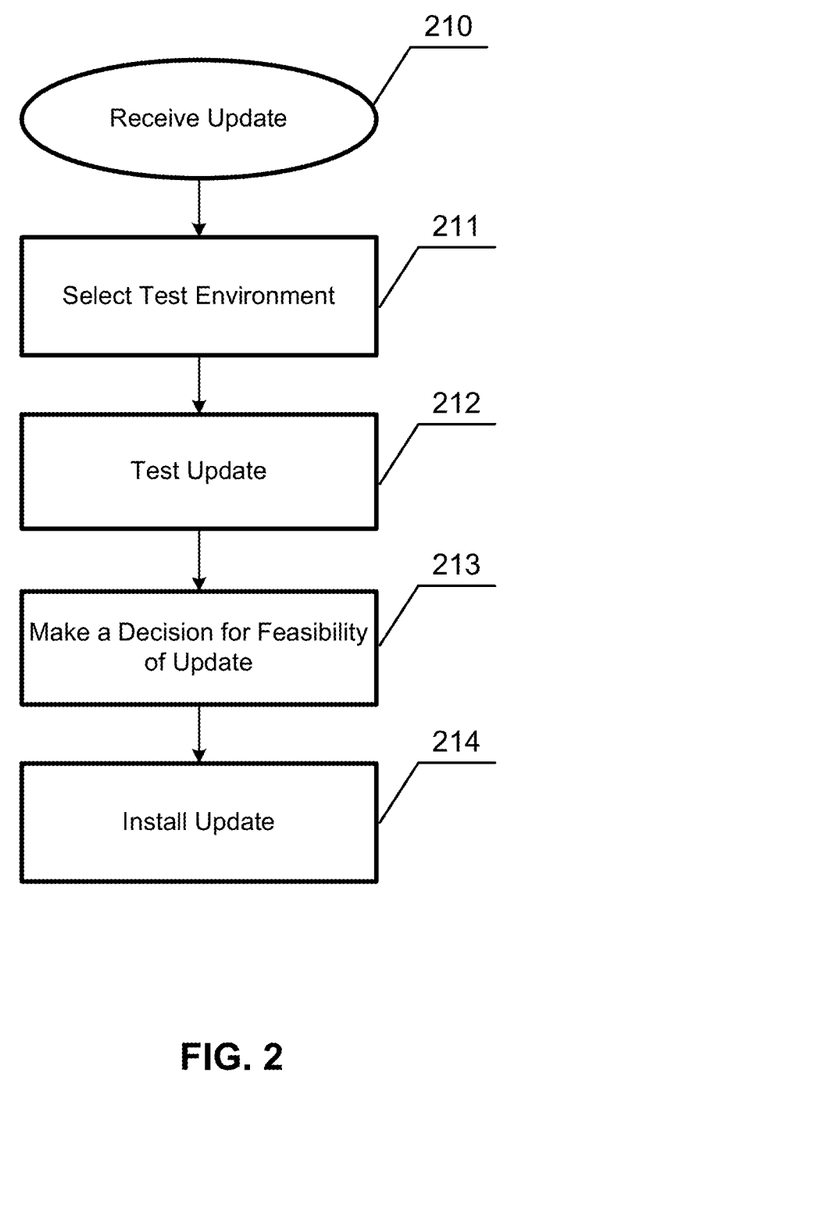
FIG. 2 illustrates an algorithm for processing the updates in the test environment, in accordance with the exemplary embodiment.

FIG. 2 illustrates an algorithm for processing the updates in the test environment, in accordance with the exemplary embodiment. In step 210, the test module 130 (see FIG. 1) receives at least one update 120 and update-related information. In step 211, the test module 130 selects the test environment 170 and the testing period using the selection algorithm for testing at least one the update 120. In step 212, the test module 130 performs the testing of at least one update 110 and generates the test results. Then, the test module 130 provides the test results and update-related of at least one tested update to the analysis module 140.

In step 213, the analysis module 140 makes an update installation decision based on the test results, update-related information and the feasibility rules. The analysis module 140 provides a list of the feasible updates to the installation module 150. The update list contains at least one update with a confirmed feasibility. Then, in step 250, the installation module installs at least one update from the list of the feasible updates. Those skilled in the art will appreciate that proposed method and system provide for efficient optimization of update installations.

Figure 3:
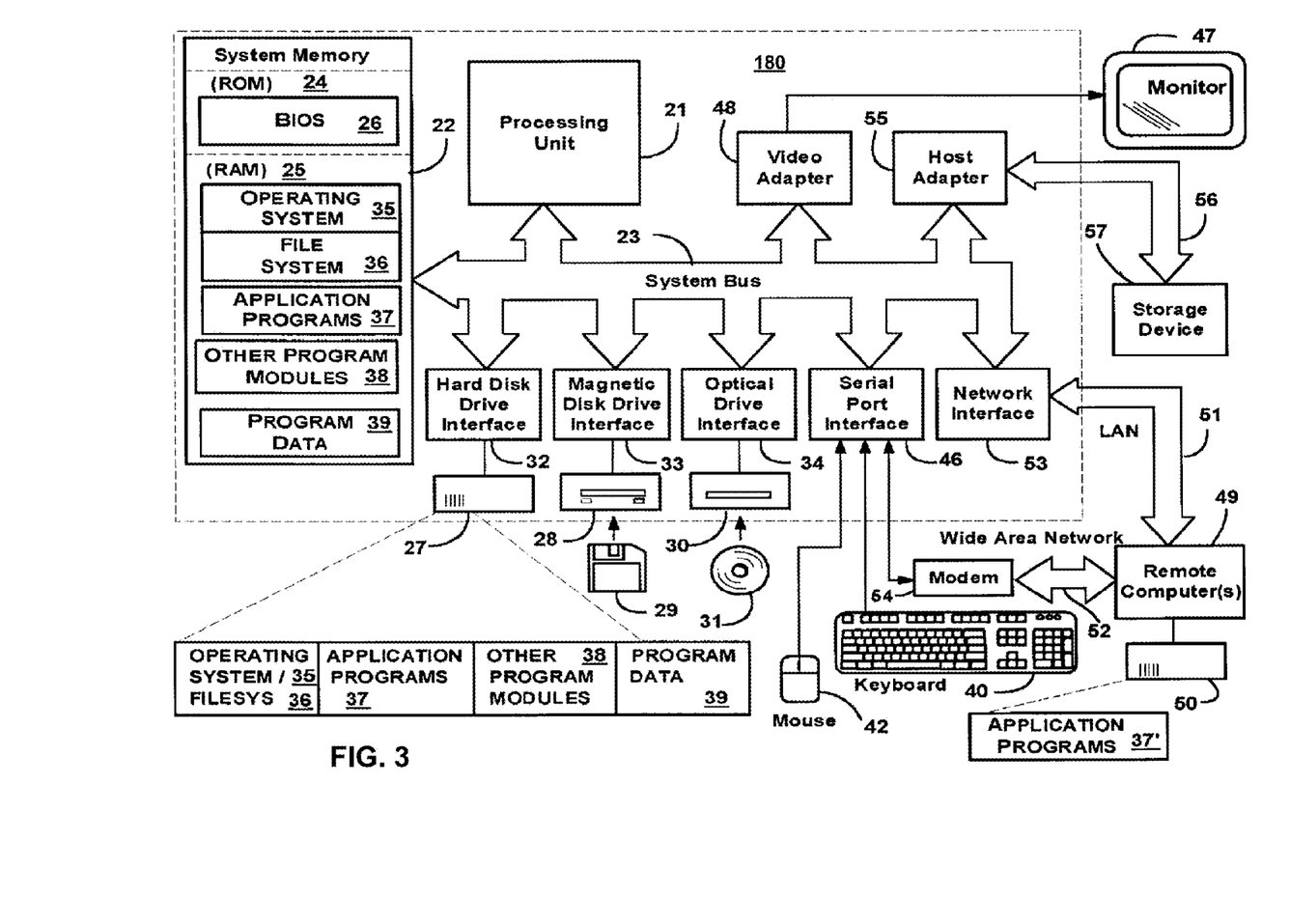
FIG. 3 illustrates a schematic of an exemplary computer system or a server that can be used for implementation of the invention.

With reference to FIG. 3, an exemplary system for implementing the invention includes a general purpose computing device in the form of a computer system/administration server 180/190 or the like including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 180 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 180.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 180 includes a file system 36 associated with or included within the operating system 35, one or more application programs 37, other program modules 38 and program data 39. A user may enter commands and information into the computer 180 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 180 may operate in a networked environment using logical connections to one or more remote computers 49. The remote computer (or computers) 49 may be another computer, a server, a router, a network PC, a peer device or other common network node, and typically includes many or all of the elements described above relative to the computer 180, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 180 is connected to the local network 51 through a network interface or adapter 53. When used in a WAN networking environment, the computer 180 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 180, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. In particular, those skilled in the art would appreciate that the proposed system and method provide for efficient processing of the system updates prior to their installation on a computer system(s).

It should also be appreciated that various modifications, adaptations and alternative embodiments thereof may be made within the scope and spirit of the present invention. The invention is further defined by the following claims.

What is claimed is:

1. A computer-implemented system for processing an update of installed software, the system comprising:
    at least one computer system having at least one installed application;
    a test module configured to receive the update and data reflecting vulnerabilities covered by the update and select a testing environment for the update based on information about the update, including information about severity and frequency of exploitation of the vulnerabilities;
    an analysis module configured to analyze test results of the update and determine a feasibility of installation of the update based on feasibility rules;
    an installation module configured to receive the update from the analysis module and to install the update on the computer system; and
    an application and hardware database accessible by the test module; and
    wherein the test module acquires data from the application and hardware database for selecting the testing environment; and
    wherein the test module also selects the testing environment based on any of:
        complexity of update testing;
        installed application usage frequency; and
        computer system usage frequency.

2. The system of claim 1, further comprising an administration server accessible by the test module and by the analysis module.

3. The system of claim 2, wherein the administration server is used as the testing environment.

4. The system of claim 2, wherein the administration server provides a configurable virtual testing environment.

5. The system of claim 1, wherein the test module is configured to determine a test time period.

6. The system of claim 4, wherein the test module determines the test time period based on a size and configuration of an infrastructure that requires the update.

7. The system of claim 1, wherein the update is any of:
    an operating system update;
    a driver update;
    an application update; and
    a patch.

8. The system of the claim 1, wherein multiple updates are aggregated into a group for testing.

9. The system of claim 1, wherein the test module selects the testing environment based on an update rating.

10. The system of claim 1, wherein the test module acquires vulnerability-related data from an administration server for selecting the testing environment.

11. A computer-implemented method for processing an update of installed software, the method comprising:
    receiving an update and update-related data;
    selecting a testing environment for the update based on information about the update, including information about severity and frequency of exploitation of vulnerabilities relating to the update;
    testing the update in the testing environment and recording test results;
    analyzing the test results and making a decision for feasibility of the update;
    adding the update to a feasible update list, if the test results do not reveal critical errors; and
    installing the update onto a computer system,
    wherein the selecting of the testing environment for the update is also based on any of:
    complexity of update testing;
    installed application usage frequency; and
    computer system usage frequency.

12. The method of claim 11, further comprising disallowing the update if the test results reveal critical errors.

13. The method of claim 11, further comprising determining a testing time period.

14. The method of claim 13, further comprising determining a testing time period based on a size and configuration of an infrastructure, which requires the update.

15. The method of claim 11, further comprising making a decision for feasibility of the update based on feasibility rules.

16. The method of claim 11, further comprising grouping multiple updates from a feasible list for testing.

17. The method of claim 11, further comprising recording user actions and using the recorded user actions for testing in a virtual environment.

18. The method of claim 11, further comprising selecting the testing environment based on a vulnerability-related data.

* * * * *